United States Patent [19]

Matsuzaki et al.

[11] 4,286,980
[45] Sep. 1, 1981

[54] METHOD AND APPARATUS FOR FORMING BENT PLATE GLASS

[75] Inventors: Kiyoto Matsuzaki; Norimoto Aya, both of Yokohama, Japan

[73] Assignee: Nissan Motor Co., Ltd., Yokohama, Japan

[21] Appl. No.: 150,529

[22] Filed: May 16, 1980

[30] Foreign Application Priority Data

May 23, 1979 [JP] Japan ............................ 54-63595

[51] Int. Cl.³ .......................................... C03B 23/027
[52] U.S. Cl. ................................... 65/106; 65/107; 65/289; 65/290; 65/291
[58] Field of Search ............... 65/106, 107, 289, 290, 65/291

[56] References Cited

U.S. PATENT DOCUMENTS

| | | | |
|---|---|---|---|
| 2,176,999 | 10/1939 | Miller | 65/107 |
| 3,248,195 | 4/1966 | Golightly et al. | 65/291 X |
| 4,047,916 | 9/1977 | Reese et al. | 65/291 X |
| 4,072,493 | 2/1978 | Imler | 65/291 X |
| 4,157,254 | 6/1979 | Thomas et al. | 65/106 X |

FOREIGN PATENT DOCUMENTS 573032  2/1958  Italy ................................. 65/291

*Primary Examiner*—Arthur D. Kellogg
*Attorney, Agent, or Firm*—Thompson, Birch, Gauthier & Samuels

[57] ABSTRACT

A method and apparatus for forming a bent plate glass using a forming bed, in which a plate glass mounted on the forming bed is locally heated along a heating line whereby the plate glass is locally softened, after first heating the entire flat plate glass. The heating line is positioned offset from a desired bending line and curved outwardly therefrom whereby the heating line becomes coincident with the desired bending line due to transformation of the initial heating line as the plate glass deforms under its own weight as it is heated to softening temperature.

10 Claims, 8 Drawing Figures

METHOD AND APPARATUS FOR FORMING BENT PLATE GLASS

This invention relates to a method and apparatus for forming a bent plate glass, for example, used as a windshield of an automotive vehicle.

A main object of the present invention is to provide an improved method and apparatus for forming a bent plate glass which is accurate in its dimentions and particularly in the dimentional locations of bent sections of a resultant bent plate glass.

Another object of the present invention is to provide an improved method and apparatus for forming a bent plate glass, by which the bent sections of a resultant bent glass are formed at desirable locations even though the initial heating of the intended bend location shifts due to deformation of the plate glass during heating.

A further object of the present invention is to provide an improved method and apparatus for forming a bent plate glass, by which the sections of a plate glass to be bent are locally heated in the shapes of curved lines which are initially oriented outwardly relative to the central portion of the plate glass.

Other objects, features and advantages of the improved method and apparatus for forming a bent plate glass will become apparent from the following description when taken in conjunction with the accompanying drawings wherein like reference numerals designate like parts and elements, in which.

Figure 1:
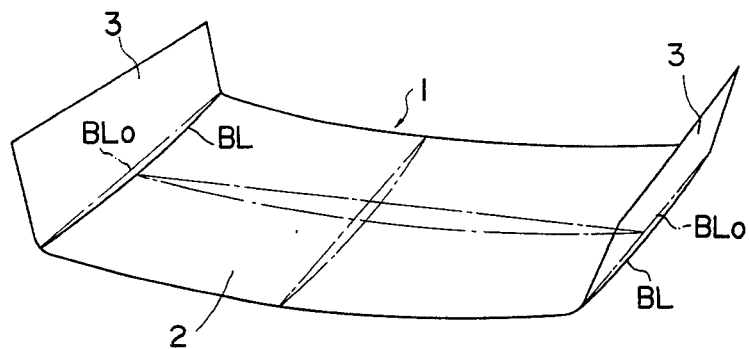
FIG. 1 is a perspective view of a bent plate glass, for example, used as a windshield of an automotive vehicle.

Referring now to FIG. 1, it has become practical use to employ as a rear windshield of an automotive vehicle a bent plate glass 1 in which a side surface section 3 is bent relative to a main surface section 2, in order to increase the rear visual field of the vehicle driver. The main surface section 2 should be so shaped as to have suitable curves in the directions of width and length of the bent plate glass to be adapted to the shape of the vehicle body (not shown). However, the side surface section 3 should be shaped into a form which is nearly flat to obtain clear visual fields of right and left rear directions of the vehicle. In general, such a bent plate glass is formed by methods in which a flat plate glass is deformed by its own weight under heat. One of these methods for forming a bent plate glass will be illustrated hereinafter with reference to FIGS. 2, 3A, 3B and 3C.

Figure 2:
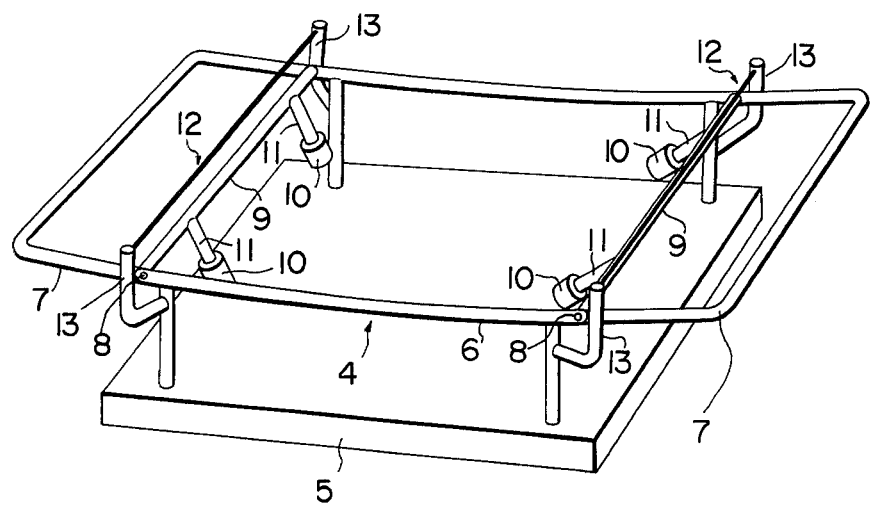
FIG. 2 is a perspective view of a conventional apparatus for forming a bent plate glass.

FIG. 2 shows a conventional forming bed or apparatus 4 for forming a bent plate glass 1 shown in FIG. 1. The forming bed 4 is composed of a fixed frame section 6 securely mounted on a base 5. The frame 4 is provided at its both sides with a movable frame sections 7 each of which is rotatable around an axis 8 passing through a rotatable rod member 9 which is securely connected to the movable frame section 7 so as to be rotatable therewith. The rod member 9 is provided with leg portions 11 each having at its free end a weight member 10. Accordingly, the movable frame 7 is constructed and arranged to be rotatable around the axis 8 to rotate upwardly in the drawing by the action of the weight member 10. It will be understood that the range of the movable frame section 7 is restricted by a mechanism (not shown) for so restricting such movement.

The fixed and movable frame sections 6 and 7 are slightly concave in the lengthwise direction, although the degree of curvature of the movable frame section 7 is less than that of the fixed frame section 6 for the above-mentioned reason.

Each of two heaters 12 extends between respective support members 13 fixedly connected to the base 5. The heater 12 is located generally above the axis 8, so that the heater approaches the surface of the plate glass $1'$ (shown in FIG. 3A) before bending when the plate glass is mounted on the bed 4. This heater 12 comprises a wire for generating superheat, for example, a nichrome wire. The heater 12 is stretched in a straight line with sufficient tension to prevent the heater wire from sagging when heated.

A method of forming a bent plate glass 2 using the above-mentioned forming bed 4 will now be explained.

A flat plate glass $1'$ which is precut in predetermined dimensions is positioned on the forming bed 4. The weight of the weight member 10 is suitably selected based on the weight, soften temperature, etc. of the glass $1'$, so that the glass prevents upward rotation of the movable frame section 7 until the plate glass is locally heated with heater 12 to locally soften the plate glass along the line where it is to be bent.

Figure 3A:
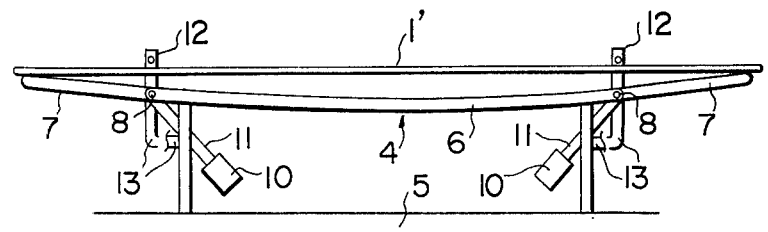
FIGS. 3A, 3B and 3C are front views illustrating a conventional process for forming the bent plate glass using the apparatus of FIG. 2.
Figure 3B:
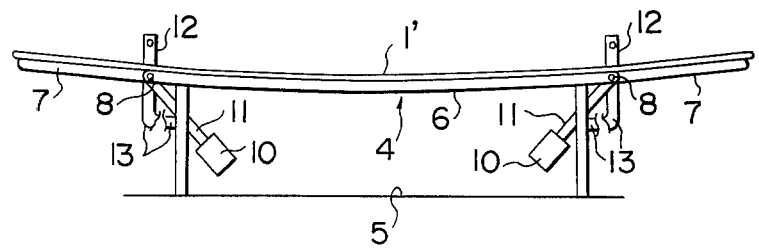

After the plate glass $1'$ is positioned on the forming bed 4, this bed is put into a heating furnace (not shown) to heat the plate glass to its softening temperature, whereupon it deforms to the shape of the bed as shown in FIG. 3B. Accordingly, the main surface section 2, having a relatively larger surface area, sags at its center under its own weight, resulting in the slightly concave surface illustrated in FIG. 1. The side surface section 3, having a relatively smaller surface, is supported at its periphery by the movable frame section 7 and accordingly, does not deform to the degree of the larger main section 2, but rather remains essentially flat across its entire area.

Figure 3C:
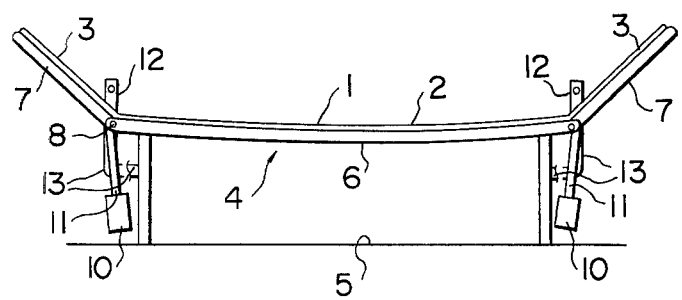

After deformation of the plate glass $1'$ in the heating furnace, electric current is passed through the heater 12 so as to locally heat the plate glass along a bending line $BL_O$ at a temperature in the vicinity of the melting point of the plate glass. This local heating and softening of the plate glass $1'$ by the heater 12 permits the movable frame section 7 to rotate upwardly under the action of the weight members 10. As a result, the plate glass $1'$ bends along a line adjacent the connecting line 8 of the movable frame 7 as shown in FIG. 3C, so as to obtain the bent plate glass 1 having the main surface section 2 and the side surface sections 3 as shown in FIG. 1.

However, the above-mentioned conventional method for forming the bent plate glass results in the following problems: During the local heating of the plate glass $1'$ by the heater 12, deformation of the central portion of the plate glass $1'$ progresses and therefore the bending line BL between the side section 3 and the main section 2 is curved and offset toward the central portion from a desired bending line $BL_O$, although the heater 12 is so arranged to heat the plate glass in a straight line. As a result, a production dimensional error of the bent plate glass 1 is unavoidably caused.

In view of the above, the present invention has been made to overcome the problems encountered in the method for forming the bent plate glass using the conventional forming bed 14 shown in FIG. 2, in which the displacement of the bending line of the plate glass toward the central portion can be corrected by carrying out the above-mentioned local heating along a line curved outwardly in anticipation of offsetting the bending line otherwise resulting from the deformation of the central portion of the flat plate glass during formation of the bent plate glass.

Figure 4:
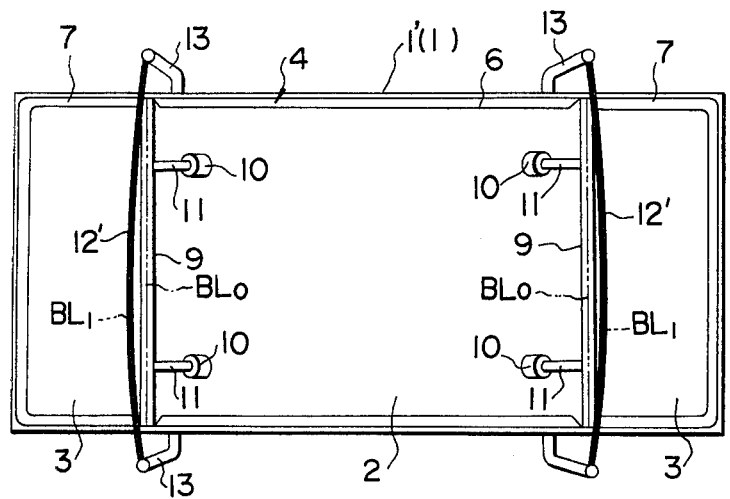
FIG. 4 is a plan view of an apparatus for forming a bent plate glass, in accordance with the present invention.

In accordance with the present invention, as shown in FIG. 4, the heater 12' is curved outwardly so that the local heating by the heater 12' is carried out along a heating line $BL_1$ which is curved outwardly from the desired resulting bending line $BL_O$, in anticipation of the transposition of the bending line BL toward the central portion of the plate glass.

With this arrangement, during the local heating of the plate glass by the heater 12' disposed as shown in FIG. 4 after heating the entire plate glass 1', the location of the heating line $BL_1$ is drawn toward the central portion of the plate glass. As a result, the locally heated line $BL_1$ which is originally curved outwardly is moved to the desired bending line $BL_O$.

Figure 5B:
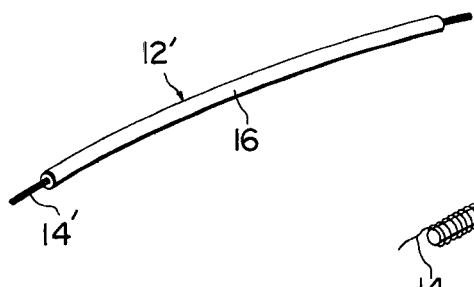
FIG. 5B is a perspective view of another example of the heater used in the apparatus of FIG. 4.
Figure 5A:
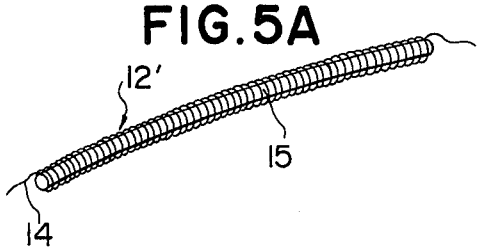
FIG. 5A is a perspective view of an example of a heater used in the apparatus of FIG. 4.

FIG. 5A shows an example of the heater 12' which is curved outwardly as shown in FIG. 4, in which the heater is constructed by forming a rod member 15 made of a heat resisting material such as ceramic into a predetermined curved shape, and then winding a nichrome wire 14 around the rod member. As seen from the drawing, the heater 12' formed thereby is disposed in the forming bed of FIG. 4 so as to be curved outward (in the shape of arc) relative to the desired resulting bending line $BL_O$ of the plate glass.

FIG. 5B shows another example of the heater 12' used in the arrangement of FIG. 4, in which the heater is constructed by forming a pipe member 16 made of a heat resisting material such as ceramic into a predetermined curved shape, and then inserting a nichrome wire 14' through the pipe member. As seen from the drawing, the pipe member 16 is slightly curved and disposed in the forming bed of FIG. 4 so as to be curved outwardly (in the shape of an arc) relative to the desired resulting bending line $BL_O$.

As may be appreciated from the above explanation, according to the present invention, the local heating of the bending line of the plate glass is carried out along the heating line which is curved outwardly relative to the desired resulting bending line, in anticipation of the transposition of the bending line toward the central portion of the plate glass. Accordingly, during the local heating by the heater, the originally curved heating line is displaced to the desired straight bending line. By anticipating the amount of bending line movement due to the plate glass deforming under its own weight and accounting therefore by correctively positioning the element that locally heats the glass, the device of the present invention produces a glass section having straight actual bending lines and accurately positioned bent sections, heretofore not accomplished by conventional devices.

What is claimed is:

1. A method of forming a bent plate glass, comprising in combination the following steps:
   (a) positioning a flat glass plate upon a forming bed,
   (b) heating said glass plate sufficiently so that said plate softens and conforms to the contour of said forming bed around the periphery thereof and further deforms slightly under its own weight;
   (c) locally heating said glass plate along an initially curved heating line disposed outwardly from a desired bending line of said glass plate; and
   (d) bending said glass plate along said initially curved heating line as said plate deforms, resulting in said heating line being transposed from its initial curved position to a position coincident with said desired bending line.

2. A method as claimed in claim 1, wherein said heating line is generally in the shape of an arc which is curved outwardly relative to a central portion of the plate glass.

3. A method as claimed in claim 2, wherein said desired bending line is generally straight, and is located inwardly from said heating line relative to said central portion of the plate glass.

4. A method as claimed in claim 1, wherein the step of heating said flat plate glass is carried out at a first temperature in the vicinity of the softening temperature of said flat plate glass.

5. A method as claimed in claim 4, wherein the step of locally heating the deformed plate glass is carried out at a second temperature in the vicinity of the melting point of said flat plate glass.

6. An apparatus for forming a bent plate glass, comprising:
   (a) a fixed frame section;
   (b) a moveable frame section rotatably connected to said fixed frame section; and
   (c) an elongate curved heating element connected to said fixed frame section to locally heat a glass plate positioned on said apparatus, said heating element being so positioned to heat said glass plate along an initially curved heating line, which heating line results in a desired transposed bending line due to heat deformation of said glass plate resulting in transposition of said initially curved heating line.

7. An apparatus as claimed in claim 6, wherein said elongate heat generating member comprises a curved rod member made of a heat resisting material, and a nichrome wire wound around said rod member.

8. An apparatus as claimed in claim 7, wherein said heat resisting material is ceramic.

9. An apparatus as claimed in claim 6, wherein said elongate heat generating member comprises a curved pipe member made of a heat resisting material having nichrome wire positioned within said pipe member.

10. An apparatus as claimed in claim 9, wherein said heat resisting material is ceramics.

* * * * *